United States Patent
Beker et al.

(10) Patent No.: US 9,257,238 B2
(45) Date of Patent: Feb. 9, 2016

(54) ELECTRODE AND METHOD OF MANUFACTURING THE SAME

(75) Inventors: Peter Beker, Ramla (IL); Gil Rosenman, Rishon-LeZion (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 801 days.

(21) Appl. No.: 13/297,324

(22) Filed: Nov. 16, 2011

(65) Prior Publication Data

US 2012/0120551 A1    May 17, 2012

Related U.S. Application Data

(60) Provisional application No. 61/414,005, filed on Nov. 16, 2010.

(51) Int. Cl.
*H01G 11/26* (2013.01)
*B82Y 30/00* (2011.01)
*B82Y 40/00* (2011.01)
*H01G 11/30* (2013.01)

(52) U.S. Cl.
CPC .............. *H01G 11/26* (2013.01); *B82Y 30/00* (2013.01); *B82Y 40/00* (2013.01); *H01G 11/30* (2013.01); *Y02E 60/13* (2013.01)

(58) Field of Classification Search
CPC ......... B82Y 30/00; B82Y 40/00; H01G 11/26
See application file for complete search history.

(56) References Cited

U.S. PATENT DOCUMENTS

| | | | |
|---|---|---|---|
| 2004/0158051 A1* | 8/2004 | Ozkan et al. | 536/23.1 |
| 2007/0092958 A1* | 4/2007 | Syed et al. | 435/173.8 |
| 2007/0111324 A1* | 5/2007 | Nie et al. | 436/518 |
| 2010/0135937 A1* | 6/2010 | O'Brien et al. | 424/59 |
| 2012/0026644 A1* | 2/2012 | Dunn et al. | 361/502 |

OTHER PUBLICATIONS

Amdursky et al. "Blue Luminescence Based on Quantum Confinement at Peptide Nanotubes", Nano Letters, 9(9): 3111-3115, 2009.
Amdursky et al. "Self-Assembled Bioinspired Quatum Dots: Optical Properties", Applied Physics Letters, 94: 261907-1-261907-3, 2009.

* cited by examiner

*Primary Examiner* — Melanie Y Brown

(57) ABSTRACT

A method of fabricating a device is disclosed. The method comprises coating a solid structure by nanostructures selected from the group consisting of peptides and amino acids, under conditions that at least partially prevent assembly of the nanostructures into supramolecular structures.

33 Claims, 8 Drawing Sheets

ELECTRODE AND METHOD OF MANUFACTURING THE SAME

RELATED APPLICATION

This application claims the benefit of priority under 35 USC 119(e) of U.S. Provisional Patent Application No. 61/414,005 filed Nov. 16, 2010, the contents of which are incorporated herein by reference in their entirety.

FIELD AND BACKGROUND OF THE INVENTION

The present invention, in some embodiments thereof, relates to an electrode and method of manufacturing an electrode, and, more particularly, but not exclusively, to an electrode characterized by high surface area and method of manufacturing such an electrode.

Electrodes are key elements in several classes of energy storage and conversion devices, including, batteries, fuel cells, capacitors and electrochemical capacitors (ultracapacitors or supercapacitors), as well as sensing devices such as amperometric biosensors and the like. Technological advances in the electronics industry have created a substantial and on-going need to reduce electrode volume and weight to attain increased electrical and electrochemical energy and power densities. In general, advances in miniaturization and weight reduction of energy storage devices have not kept pace with the miniaturization and portability of other electronic components.

Electrical and electrochemical energy storage and peak power generally scale with the available surface area of the electrode. Hence, a route to increasing the ratio of stored energy and peak power to the weight and volume of the electrodes is to increase the surface area of the electrodes.

Several attempts have been made to produce materials with high specific areas (surface area divided by the mass or volume of the bulk material). U.S. Pat. Nos. 4,515,763 and 4,851,206 teach the preparation of such materials as metallic carbide and nitride powder catalysts. High surface area electrodes based on etched or patterned metal surfaces are disclosed in U.S. Pat. No. 5,062,025, high surface area electrode based on carbon powders or foams are disclosed in U.S. Pat. Nos. 5,079,674 and 4,327,400, and high surface area electrodes based on ruthenium oxides are disclosed in U.S. Pat. No. 5,185,679.

Also known, are high surface area electrodes which comprise a support coated by peptide macromolecular structures, where the peptide macromolecular structures are composed of a plurality of peptides self-assembled into the peptide macromolecular structures [U.S. Published Application No. 2007-0138007]. International Publication No. WO2008/068752 discloses an array of vertically aligned elongated peptide nanostructures. Peptide monomers dissolved in an organic volatile solvent are placed on a substrate. While generating conditions for self assembling of the monomers, the solvent is evaporated to form elongated peptide nanostructures arranged generally perpendicularly on the substrate. The thus formed array can be incorporated in sensing and stimulating devices such as medical leads.

SUMMARY OF THE INVENTION

According to an aspect of some embodiments of the present invention there is provided an electroactive device. The device comprises a solid structure coated by at least one layer of discrete peptide nanocrystals.

According to some embodiments of the invention at least some of the discrete peptide nanocrystals occupy pores in the surface of the solid structure.

According to some embodiments of the invention at least some of the discrete peptide nanocrystals are peptide quantum dots.

According to some embodiments of the invention the device wherein the discrete peptide nanocrystals are devoid of or contain less than 10% cyclic peptides.

According to some embodiments of the invention the solid structure is an electrically conductive electrode.

According to some embodiments of the invention the solid structure is a carbon electrode. According to some embodiments of the invention the solid structure is an activated carbon electrode.

According to some embodiments of the invention the solid structure is a semiconductor electrode.

According to an aspect of some embodiments of the present invention there is provided an energy storage device, which comprises the electroactive device described herein.

According to some embodiments of the invention the energy storage device is an electrochemical capacitor.

According to some embodiments of the invention the energy storage is an electrochemical capacitor.

According to some embodiments of the invention the electrochemical supercapacitor is a supercapacitors or a ultracapacitors.

According to some embodiments of the invention the electrochemical capacitor is configured for capacitive storage of electrical energy.

According to some embodiments of the invention wherein the electrochemical capacitor is configured for Faradic storage of electrical energy.

According to an aspect of some embodiments of the present invention there is provided an electrochemical cell, which comprises the electroactive device as described herein.

According to an aspect of some embodiments of the present invention there is provided method of storing electrical energy. The method comprises charging the energy storage device.

According to an aspect of some embodiments of the present invention there is provided a method of fabricating a device. The method comprises coating a solid structure by nanostructures selected from the group consisting of peptides and amino acids, under conditions that at least partially prevent assembly of the nanostructures into supramolecular structures.

According to some embodiments of the invention at least some of the nanostructures are discrete peptide nanocrystals.

According to some embodiments of the invention at least some of the discrete peptide nanocrystals are peptide quantum dots.

According to some embodiments of the invention at least some of the nanostructures are peptide oligomers, and the method further comprises generating conditions for the oligomers to form discrete peptide nanocrystals, while at least partially preventing assembly of the discrete peptide nanocrystals into supramolecular structures.

According to some embodiments of the invention at least some of the peptides are linear peptide monomers, wherein the conditions are selected so as to at least partially prevent transformation of the linear peptide monomers into cyclic peptide monomers.

According to some embodiments of the invention the coating comprises immersing the solid structure in a liquid solution containing the nanostructures.

According to some embodiments of the invention the coating is effected by vapor deposition.

According to some embodiments of the invention the method comprises forming the nanostructures by a top-down process.

According to some embodiments of the invention the top-down process comprises a chemical process.

According to some embodiments of the invention the top-down process comprises a chemical process.

According to some embodiments of the invention the chemical process comprises treatment in inorganic solution.

According to some embodiments of the invention the inorganic solution comprises sulfuric acids of sufficiently low pH.

According to some embodiments of the invention the chemical process comprises treatment in organic solution.

According to some embodiments of the invention the organic solution comprises hexafluoro-2-propanol.

According to some embodiments of the invention the top-down process comprises a mechanical process.

According to some embodiments of the invention the mechanical process comprises treatment by ultrasound waves.

According to some embodiments of the invention the solid structure is an electrode.

According to some embodiments of the invention the solid structure is a carbon electrode.

According to some embodiments of the invention the solid structure is an activated carbon electrode.

According to some embodiments of the invention the solid structure is a semiconductor structure.

According to an aspect of some embodiments of the present invention there is provided an energy storage device. The device comprises an electrode device manufactured by the method described herein.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic illustration of an electroactive device, according to some embodiments of the present invention.

FIG. 2 is a schematic illustration of an energy storage device, according to some embodiments of the present invention.

FIG. 3 shows cyclic voltammetry graphs of an electrode coated by peptide nanocrystals according to some embodiments of the present invention.

FIG. 4 shows cyclic voltammetry of an electrode coated with peptide by vapor deposition technology.

Figure 5A:
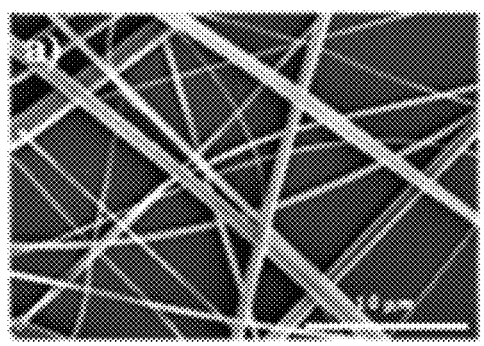
Figure 5B:
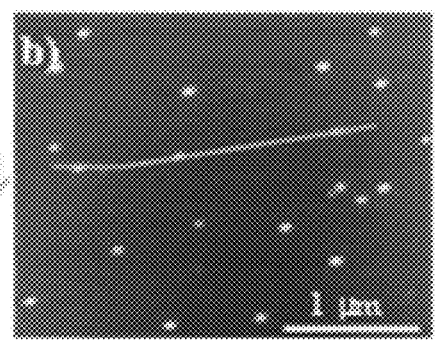

FIGS. 5*a-b* show images of FF PNT (FIG. 5*a*) and PQD (FIG. 5*b*).

Figure 5C:
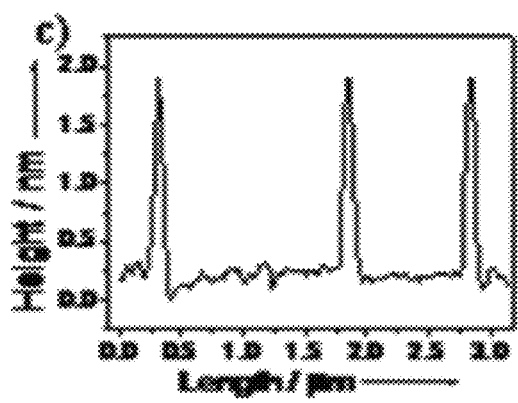
Figure 5D:
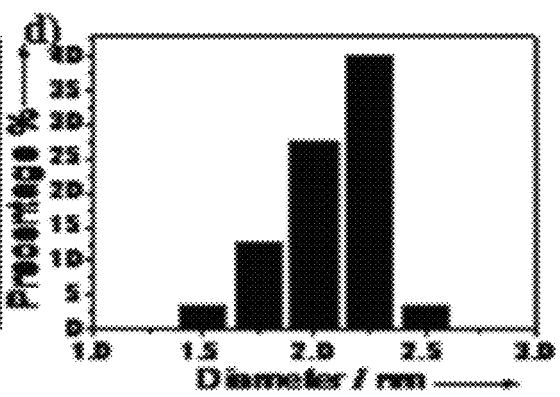

FIGS. 5*c-d* show size measurements of PQD.

Figure 6:
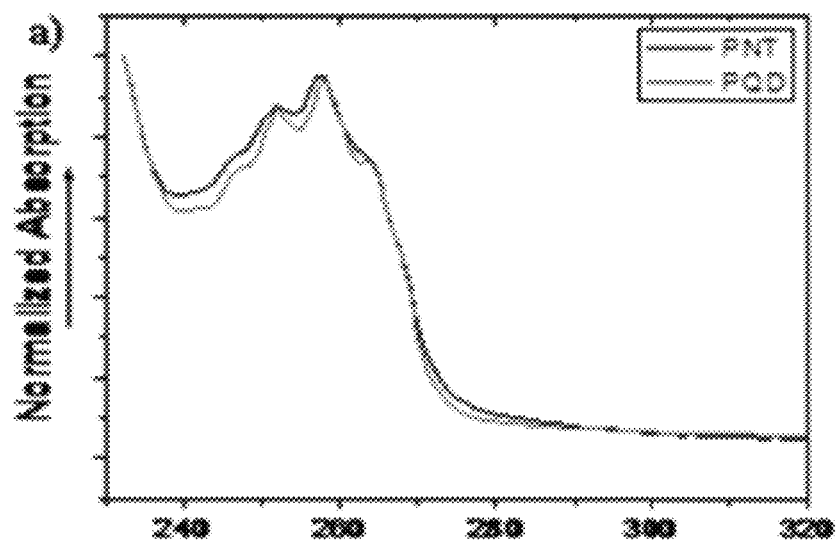

FIG. 6 shows optical absorption spectrum of FF PNT (black line) and FF PQD (red curve).

Figure 7:
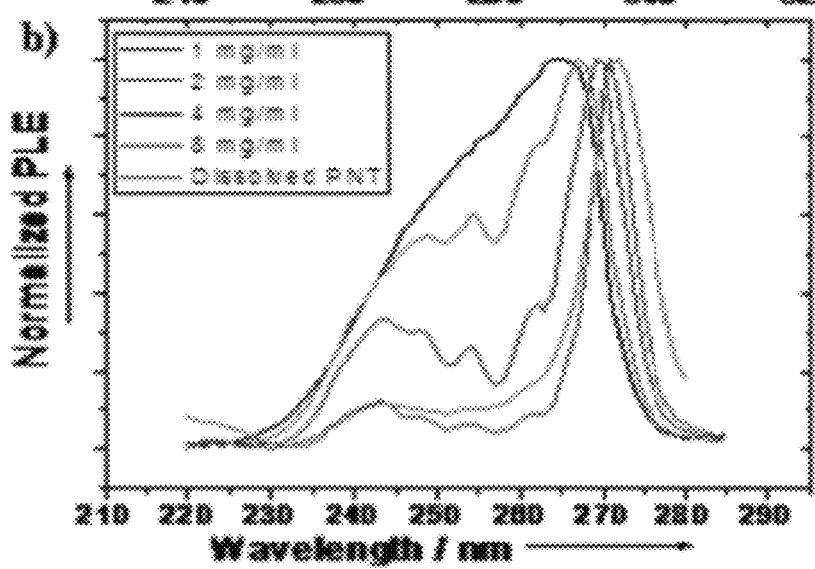

FIG. 7 shows PLE spectra of FF PQD at several concentrations, and FF PNT dissolved in methanol.

Figure 8:
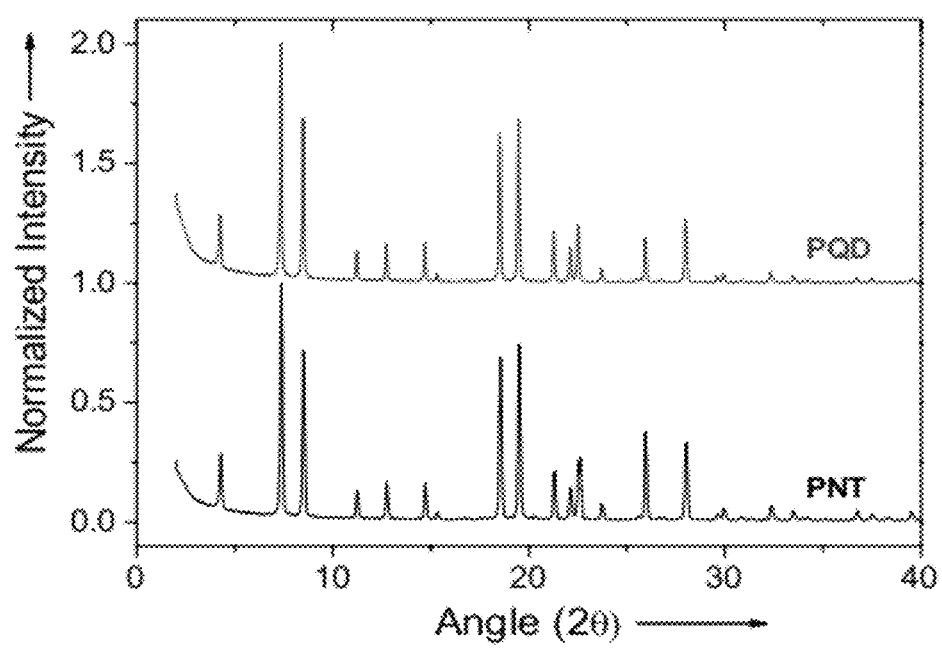

FIG. 8 shows XRD of FF PQD (red) and PNT (black).

Figure 9A:
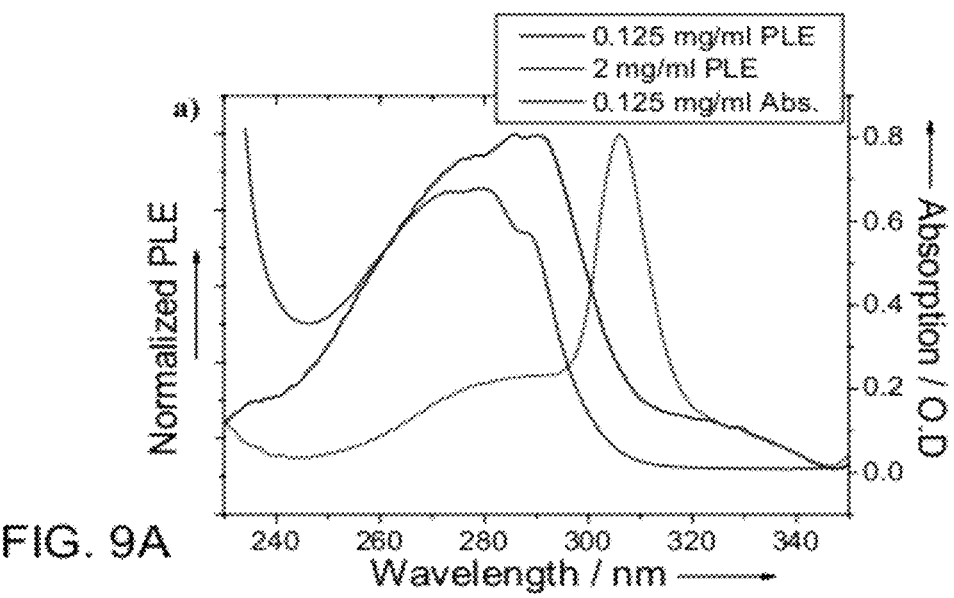

FIG. 9*a* shows optical absorption (blue curve) and PLE (black and red curves) spectra of FW PQD.

Figure 9B:
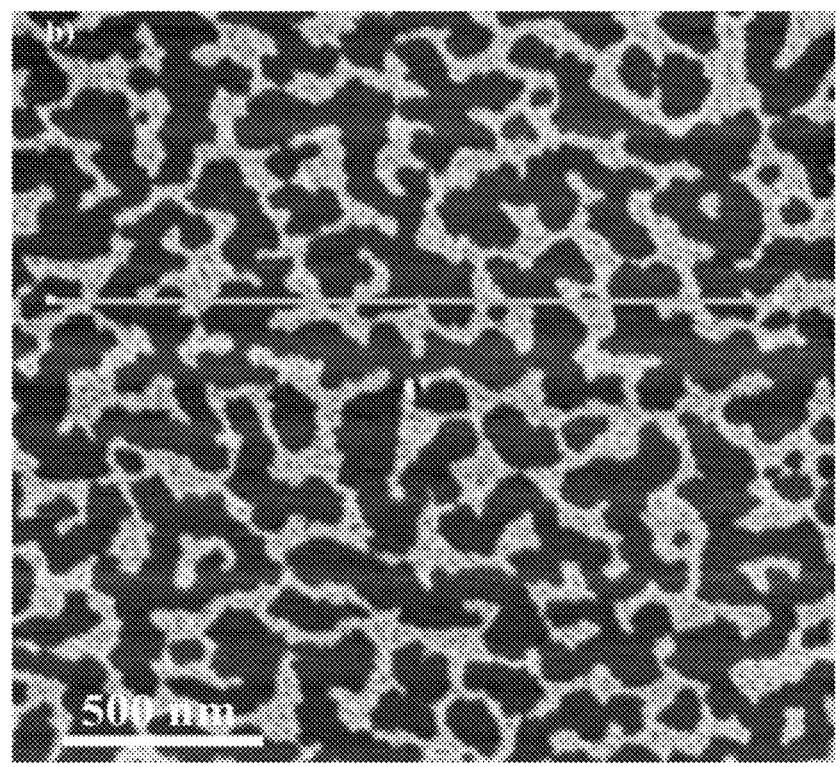

FIG. 9*b* shows AFM image of a FW PQD layer.

Figure 9C:
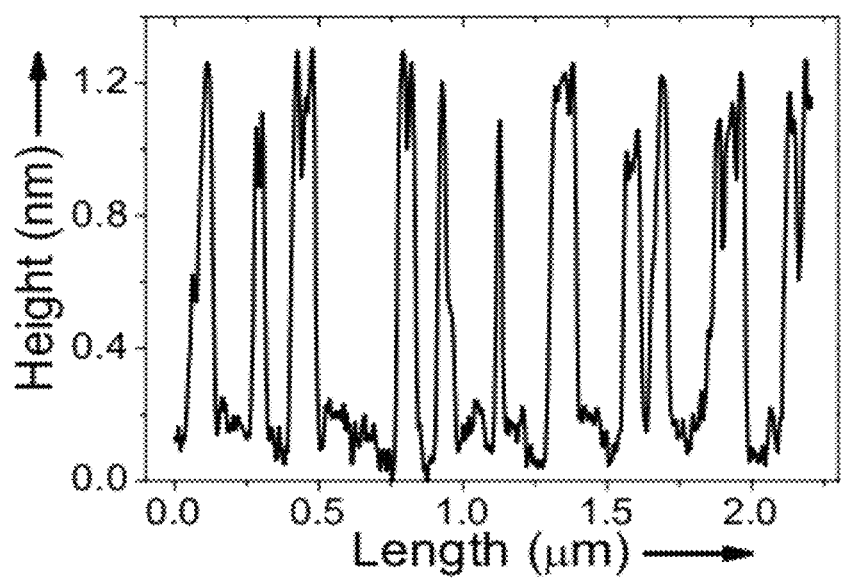

FIG. 9*c* shows a cross section along the green line of FIG. 9*b*.

Figure 10A:
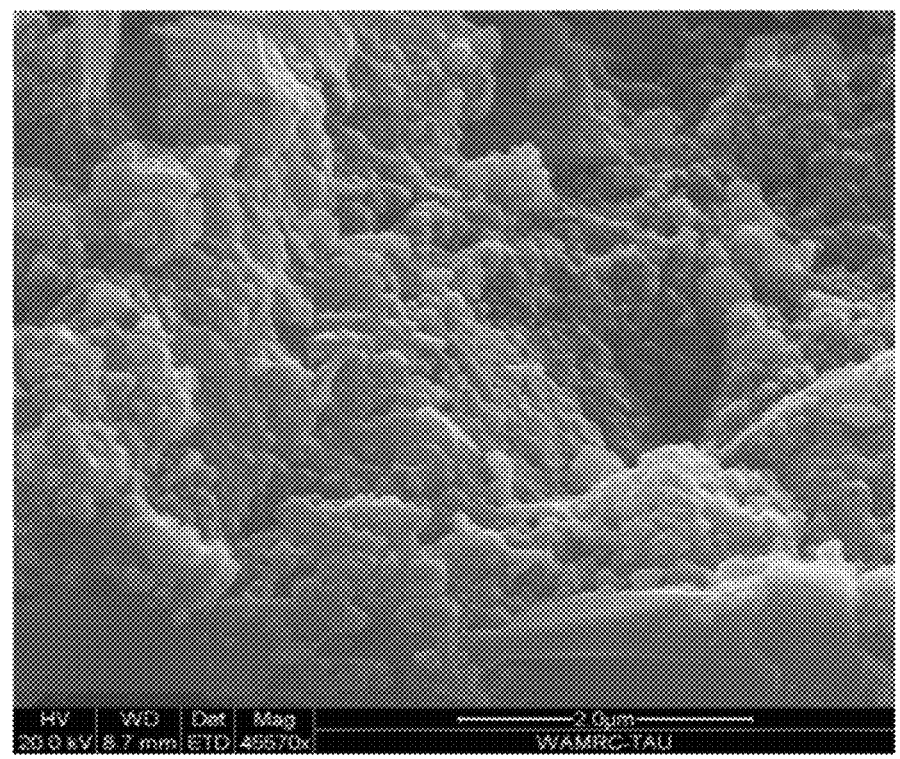
Figure 10B:
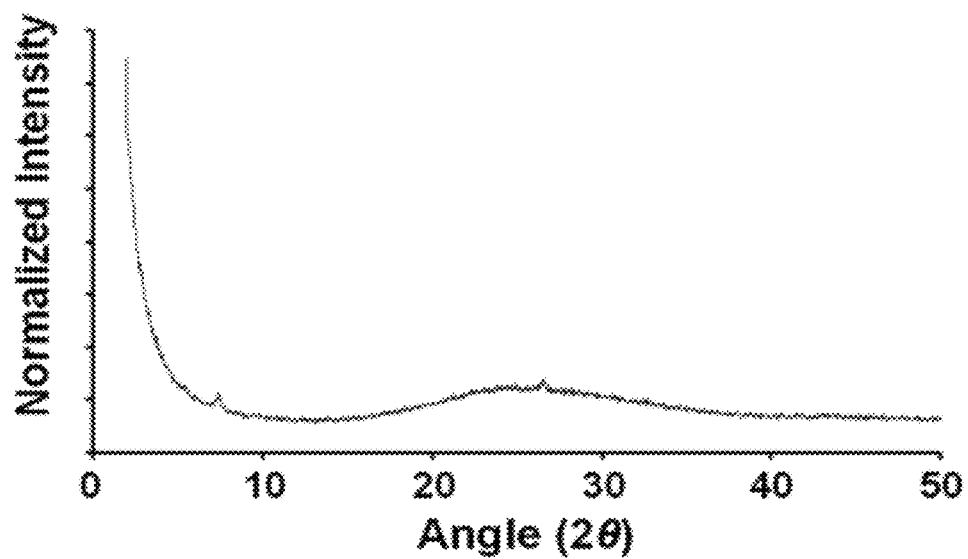

FIGS. 10A and 10B show an HRSEM image (FIG. 10A) and XRD plot (FIG. 10B) of a peptide oligomers coating formed according to some embodiments of the present invention on a carbon electrode by chemical deposition.

DESCRIPTION OF SPECIFIC EMBODIMENTS OF THE INVENTION

The present invention, in some embodiments thereof, relates to an electrode and method of manufacturing an electrode, and, more particularly, but not exclusively, to an electrode characterized by high surface area and method of manufacturing such an electrode.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

While conceiving the present invention it has been hypothesized and while reducing the present invention to practice it has been realized that electrode with increased surface area as well as sufficiently high wettability has enhanced electrical performance. It was found by the present inventors that an electrode coated with supramolecular structures has increased surface area, but rather low wettability and large weight. The present inventors have devised an electrode having high surface area as well as sufficiently high wettability and low weight. The present inventors have devised a technique for fabricating such an electrode. The present inventors found that the technique is also suitable for coating other structures, not necessarily conductive structure, particularly when it is desired to fabricate devices having surfaces characterized by high surface, high wettability and low weight. For example, in experiments performed by the present inventors.

According to the present embodiments, a surface or part of a surface of solid a structure, such as, but not limited to, an electrode (e.g., a carbon electrode, an activated carbon electrode or any other electrically conductive solid structure or semiconductor solid structure), is coated by nanostructures. The surface of the solid structure is optionally and preferably porous, so as to allow the nanostructures to at least partially penetrate into the surface.

In various exemplary embodiments of the invention the nanostructures are selected from the group consisting of peptide structures and amino acids, and the coating is preferably executed such as to form on the surface of the structure one or more layers of peptide nanocrystals. It was found by the present inventors that such a layer is particularly advantageous from the stand points of surface area and wettability.

The term "nanocrystal (NC)," as used herein, refers to a crystalline structure having a highest dimension which is less than 100 nm, more preferably less than 50 nm, more preferably less than 10 nm or less than 7 nm, or less than 6 nm, or less than 5 nm, or less than 4 nm, or less than 3 nm, e.g., about 1 or 2 nm.

When material dimensions are shrunk to nanometer scale, its physical, optical, and electrical characteristics become extremely different from its bulk material dimensions. Low dimensional nanostructures can be categorized according to their dimensionality, and include two dimensional quantum wells, one dimensional quantum wires, and zero dimensional quantum dots.

A quantum well, as used herein, is quantum nanostructure that exhibits quantum confinement effects such that there is a one-dimensional confinement of electron-hole bound pairs or free electrons and holes.

The term "quantum confinement," as used herein refers to a phenomenon in which there are quantized energy levels in at least one dimension.

A quantum wire, as used herein, is quantum nanostructure that exhibits quantum confinement effects such that there is a two-dimensional confinement of electron-hole bound pairs or free electrons and holes.

A quantum dot, as used herein, is a quantum nanostructure that exhibits quantum confinement effects such that there is a three-dimensional quantum confinement of electron-hole bound pairs or free electrons and holes. Thus, a quantum dot is structurally different from a quantum wire, in that the electron-hole bound pairs or free carriers in a quantum wire are confined only in two-dimension and are generally free in the third dimension. A quantum dot is also structurally different from a quantum well, in that the electron-hole bound pairs or free carriers in a quantum well are confined only one-dimension and are generally free in the other two-dimensions.

In some embodiments, the peptide nanocrystal is a quantum dot. Preferably, the largest cross-sectional dimension of the quantum dot of the present embodiments is of less than about 10 nanometers, e.g., from about 0.5 nanometers to about 3 nanometers.

A representative example of a nanocrystal suitable for the present embodiments is a structure formed from two FF peptides.

In some embodiments of the present invention the coating layer(s) are devoid of or contain less than 10% peptide quantum wells. A reduced number of quantum wells can be ensured, for example, using linear peptide and judicious selection of the coating conditions. Preferably, the temperature of the linear peptide is selected such that the linear peptides are prevented from undergoing a phase transition to cyclic peptides.

For example, the chemical (molecular) transformation of linear FF dipeptide to cyclic FF dipeptide occurs at the temperature range of 130-180° C. During this process, the amino and the carboxylic ends of the peptide are connected via a covalent bond, when a water molecule is released. Therefore, the region of the heater temperature in deposition is preferably below 130° C.

In various exemplary embodiments of the invention the peptide material is selected such that the characteristic phase transition temperature for the transition of linear to cyclic structure is at least above 130° C.

In various exemplary embodiments of the invention the solid structure is coated under conditions that at least partially prevent assembly of the nanostructures into supramolecular structures.

As used herein "supramolecular structure" refers to any structure composed of sub-units connected via non-covalent interaction.

The term supramolecular structure encompasses at least any of the following structures: nanotube, nanowire, nanosphere, nanorod, nanodisk, nanotape and hydrogel.

The elementary building blocks of a supramolecular structure are typically nanocrystals, wherein the supramolecular structure is composed of a plurality of nanocrystals bound to each other by non-covalent bonds (e.g., weak bonds such as H— bonds and bonds maintained by Van der Waals forces). The nanocrystals are "elementary" in the sense that the supramolecular structures are formed only from nanocrystals but not from constituents of nanocrystals.

Although being elementary building blocks of a supramolecular structure, the nanocrystals of the present embodiments are preferably not assembled into supramolecular structures during or after the coating process.

Peptides nanocrystals which are not assembled into a supramolecular structure are referred to herein as "discrete peptide nanocrystals". In various exemplary embodiments of the invention at least 70%, or at least 80% or at least 90% or at least 95%, preferably 99% or more of the peptide material in the coating layer(s) is in the form of discrete peptide nanocrystals.

In some embodiments of the invention, the distance between the nanocrystals forming the coating layer(s) is, on the average, above 1 Å or above 2 Å or above 3 Å or above 4 Å or above 5 Å.

The coating process is preferably executed so as to form one or more coating layers made of peptide nanocrystals and generally devoid of any non-covalent bonds among two or more peptide nanocrystals. In some embodiments, the surface of the solid structure is coated with a single layer of peptide nanocrystals. In various exemplary embodiments of the invention at least 70%, or at least 80% or at least 90% or at least 95%, preferably 99% or more of the peptide material in the coating layer(s) is devoid of any non-covalent bonds among the coating itself. It is to be understood, however, that non-covalent attachment between the coating layer and the material beneath the coating layer is not excluded from the scope of the present invention.

A coating of discrete nanocrystals can be provided in more than one way.

In some embodiments, the discrete nanocrystals are provided as non-assembled particles. In these embodiments the raw material used in the coating process includes non-assembled nanocrystals. Thus for example, the surface of the solid structure can be contacted with liquid containing the non-assembled nanocrystals or it can be subjected to a vapor deposition process in which the vapors contain the non-assembled nanocrystals.

In some embodiments of the present invention, a top-down process is employed for providing the discrete nanocrystals. In these embodiments the coating process is preceded by the top-down process to provide the discrete nanocrystals, which are then used as raw material used in the coating process. In experiments performed by the present inventors, supramolecular structures have been disassembled into quantum dots. Some of these experiments are provided in the Examples section that follows.

In some embodiments of the present invention, the discrete nanocrystals are formed by a bottom-up process. For example, a peptide material including peptide oligomers can be provided and conditions can be generated for to allow the oligomers to form discrete peptide nanocrystals.

The formation of peptide nanocrystals from oligomers can be before the coating process, in which case the raw material for used in the coating process is the formed peptide nanocrystals. Alternatively, the raw material for used in the coating process can include peptide oligomers, in which case peptide oligomers form the peptide nanocrystals in-situ while contacting the surface of the solid structure or during the coating process itself. Thus, for example, the coating process can include a stage in which an amorphous layer of peptide oligomers is deposited on the surface of the solid structure. Thereafter, conditions are generated such that the oligomers form peptide nanocrystals on the surface.

Also contemplated are embodiments in which amino acid molecules are provided instead of, or in addition to, the peptide material. In these embodiments, the amino acids first form peptide oligomers by dimerization, trimerization, tetramization and/or multimerization. This is optionally and preferably accomplished using an appropriate multimerization agent, such as, but not limited to, one or more fusion molecules. Thereafter, the peptide oligomers form the nanocrystals as further detailed hereinabove. The formation of oligomers from amino acid molecules can be before the coating process, in which case the raw material for used in the coating process is the formed oligomers or subsequently formed peptide nanocrystals, as further detailed hereinabove. Alternatively, the raw material for used in the coating process can include amino acid molecules, in which case the amino acid molecules form oligomers in-situ while contacting the surface of the solid structure or during the coating process itself.

The peptide structures or amino acid molecules used for coating according to some embodiments of the present invention preferably have properties selected in accordance with the application form which the fabricated coated structure is to be used. In some embodiments of the present invention the coating employ peptide monomers which are capable of forming amorphous layer of oligomers, which thereafter from discrete peptide nanocrystals, preferably of sufficiently small size to allow penetration of the nanocrystals into pores in the surface of the solid structure.

The present embodiments contemplate several coating techniques. Typically, the coating employs adhesion technology. The adhesion can occur from a solution of the nanostructures (discrete peptide nanocrystals, peptide oligomers or amino acid molecules). For example, an electrode can be immersed into a solution which contains the nanostructures thus allowing adherence of the nanostructures to the surface of the electrode. Optionally, the process is executed in the presence of an electrical field. For example, when the nanostructures are charged, an external electrical field can be applied such that the nanostructures are attracted to the surface of the solid structure.

In some embodiments of the present invention the coating employs vapor deposition of the discrete peptide nanocrystals onto the surface of the electrode.

Vapor deposition (VD) refers to a process in which materials in a vapor state are condensed through condensation, chemical reaction or conversion to form a solid material. VD is used to form coatings to alter the mechanical, electrical, thermal, optical, corrosion resistance, and wear properties of the coated substrates, as well as to form free-standing bodies, films, and fibers and to infiltrate fabric to form composite materials. VD processes typically take place within a vacuum chamber, and are classified into two process categories: physical vapor deposition (PVD) and chemical vapor deposition (CVD).

In PVD, there is typically a single source material which is vaporized and deposited over the substrate. The source PVD methods are clean, dry vacuum deposition methods in which the coating is deposited over the entire object simultaneously, rather than in localized areas. PVD covers a number of deposition technologies in which material is released from a source and transferred to the substrate. The vapor can be generated thermally thus these techniques are called evaporation of layer material. Yet, condensable particles can also be generated by pulse transmission during bombardment with high-energy ions. Such process is also known as sputtering. The choice of deposition method, namely evaporation or sputtering, depends mostly on the coating and coated materials and the availability of a technology for these specific materials.

In evaporation-based techniques the substrate is placed inside a vacuum chamber, in which a source material to be deposited is also located. The source material is then heated to the point where it starts to evaporate. Vacuum is required to allow the molecules to evaporate freely in the chamber, and they subsequently condense on all surfaces. The evaporation technique may include electron beam evaporation and resistive evaporation. In electron beam evaporation, an electron beam is aimed at the source material causing local heating and evaporation. In resistive evaporation, electrical current heats a resistor such as tungsten which is in thermal contact with the source material. The amount of heat is selected to evaporate the material.

In sputtering-based techniques the material is released from the source at much lower temperature than evaporation. The substrate is placed in a vacuum chamber with the source material, and an inert gas (such as argon) is introduced at low pressure. Gas plasma is struck using a radiofrequency power source, causing the gas to become ionized. The ions are accelerated towards the surface of the source material, causing atoms of the source material to break off in vapor form and condense on all surfaces including the substrate. As in evaporation-based techniques, the basic principle of sputtering is the same for all sputtering technologies, while various approaches differ in the way the ion bombardment of the source material is effected.

In PVD, there are typically two or more source materials which is are vaporized and a chemical reaction takes place between the vaporized source materials prior to, during and/or subsequently to their deposition over the substrate. The product of that reaction is a solid material with condenses on all surfaces inside the reactor. Depending on the process and operating conditions, the reactant gases may undergo homogeneous chemical reactions in the vapor phase before striking the surface. Various CVD techniques are contemplated, including, without limitation, atmospheric pressure chemical vapor deposition (APCVD), low pressure chemical vapor deposition (LPCVD), plasma assisted (enhanced) chemical vapor deposition (PACVD, PECVD), photochemical vapor deposition (PCVD), laser chemical vapor deposition (LCVD), metal-organic chemical vapor deposition (MOCVD), chemical beam epitaxy (CBE), and chemical vapor infiltration (CVI).

Techniques for coating by vapor deposition suitable for the present embodiments are disclosed in PCT Patent Application No. PCT/IL2008/001118 filed 13 Aug. 2008, the contents of which are hereby incorporated by reference.

The use of discrete nanocrystals, e.g., quantum dots for coating an electrode has several advantages. A first advantage is that it simplifies the electrode modification process. A second advantage is that it provides much higher effective electrode area of energy storage devices. A third advantage is a reduction of the gravimetric capacitance. These advantages are useful for supercapacitor devices. It was found by the present inventors that the use of discrete nanocrystals increases the surface area of a conventional carbon electrode by several hundred times. This allows in cerement of the storage capability of the coated electrode by the same amount. The low weight of the discrete peptide nanocrystals of the present embodiments also enhances the gravimetric capacitance of the electrode.

In various exemplary embodiments of the invention the discrete nanocrystals optionally and preferably are dielectrics. For example, in some embodiments the discrete nanocrystals are characterized by an energy gap of approximately 5 eV. In use, the coating layer of the present embodiments optionally and preferably form an electrical double layer, also known as a Helmholtz layer. Charge deposited at the side of the coating that is exposed (e.g., to the environment or a substance such as an electrolyte) results in generation of an opposite charge at the side of the coating that is in contact with the underneath electrode body surface. The average thickness of the coating layer of the present embodiments is typically less than 5 nm or less than 4 nm or less than 3 nm, e.g., from about 1 nm to about 2 nm. Thus, in some embodiments of the present invention the discrete nanocrystals form a monolayer.

The term "peptide" as used herein encompasses native peptides (either degradation products, synthetically synthesized peptides or recombinant peptides) and peptidomimetics (typically, synthetically synthesized peptides), as well as peptoids and semipeptoids which are peptide analogs, which may have, for example, modifications rendering the peptides more stable while in a body. Such modifications include, but are not limited to N terminus modification, C terminus modification, peptide bond modification, including, but not limited to, $CH_2$—NH, $CH_2$—S, $CH_2$—S=O, O=C—NH, $CH_2$—O, $CH_2$—$CH_2$, S=C—NH, CH=CH or CF=CH, backbone modifications, and residue modification. Methods for preparing peptidomimetic compounds are well known in the art and are specified, for example, in Quantitative Drug Design, C. A. Ramsden Gd., Chapter 17.2, F. Choplin Pergamon Press (1992), which is incorporated by reference as if fully set forth herein. Further details in this respect are provided hereinunder.

Peptide bonds (—CO—NH—) within the peptide may be substituted, for example, by N-methylated bonds (—N($CH_3$)—CO—), ester bonds (—C(R)H—C—O—O—C(R)—N—), ketomethylen bonds (—CO—$CH_2$—), α-aza bonds (—NH—N(R)—CO—), wherein R is any alkyl, e.g., methyl, carba bonds (—$CH_2$—NH—), hydroxyethylene bonds (—CH(OH)—$CH_2$—), thioamide bonds (—CS—NH—), olefinic double bonds (—CH=CH—), retro amide bonds (—NH—CO—), peptide derivatives (—N(R)—$CH_2$—CO—), wherein R is the "normal" side chain, naturally presented on the carbon atom.

These modifications can occur at any of the bonds along the peptide chain and even at several (2-3) at the same time.

The peptides of the discrete peptide nanocrystals of the present embodiments typically comprise from 2 to 15 amino acid residues. For example, the peptides can be short peptides of less than 10 amino acid residues, or less than 8 amino acid residues and or peptides of 2-6 amino acid residues (namely each peptide having 2, 3, 4, 5, or 6 amino acid residues).

As used herein the phrase "amino acid" or "amino acids" is understood to include the 20 naturally occurring amino acids; those amino acids often modified post-translationally in vivo, including, for example, hydroxyproline, phosphoserine and phosphothreonine; and other unusual amino acids including, but not limited to, 2-aminoadipic acid, hydroxylysine, isodesmosine, nor-valine, nor-leucine and ornithine. Furthermore, the term "amino acid" includes both D- and L-amino acids.

Natural aromatic amino acids, Trp, Tyr and Phe, may be substituted for synthetic non-natural acid such as Phenylglycine, TIC, napthylalanine (Nal), phenylisoserine, threoninol, ring-methylated derivatives of Phe, halogenated derivatives of Phe or O-methyl-Tyr and β-amino acids.

The peptides of the present embodiments may include one or more modified amino acids or one or more non-amino acid monomers (e.g. fatty acids, complex carbohydrates etc).

The peptides can include aromatic and/or non-aromatic amino acid residue.

The phrase "aromatic amino acid residue", as used herein, describes an amino acid residue that has an aromatic moiety, as defined herein, in its side-chain.

In some embodiments each of the peptides comprises the amino acid sequence X—Y or Y—X, wherein X is an aromatic amino acid residue and Y is any other amino acid residue. Use of peptides which are devoid of aromatic amino acid residues is also contemplated.

The peptides of the present invention can be a single amino acid or a peptide composed of at least 2 amino acids in length.

In some embodiments of the present invention, one or several of the peptides is a polyaromatic peptide, which comprises one, two or more aromatic amino acid residues.

As used herein the phrase "polyaromatic peptides" refers to peptides which include at least 80%, more preferably at least 85%, more preferably at least 90%, more preferably at least 95% or more aromatic amino acid residues. In some embodiments, at least one peptide consists essentially of aromatic amino acid residues. In some embodiments, each peptide consists essentially of aromatic amino acid residues.

Thus for example, the peptides can include any combination of: dipeptides composed of one or two aromatic amino acid residues; tripeptides including one, two or three aromatic amino acid residues; and tetrapeptides including two, three or four aromatic amino acid residues and so on.

In some embodiments of the present invention, the aromatic amino acid are any naturally occurring or synthetic aromatic residue including, but not limited to, phenylalanine, tyrosine, tryptophan, phenylglycine, or modificants, precursors or functional aromatic portions thereof.

In some embodiments, one or more peptides include two amino acid residues, and hence is a dipeptide.

Each of these dipeptides can include one or two aromatic amino acid residues. Preferably, but not obligatorily each of these dipeptides includes two aromatic amino acid residues. The aromatic residues composing the dipeptide can be the same, such that the dipeptide is a homodipeptide, or different. In some embodiments, the nanostructures are formed from homodipeptides.

Hence, in some embodiments each peptide is a homodipeptide composed of two aromatic amino acid residues that are identical with respect to their side-chains residue.

The aromatic amino acid residues can comprise an aromatic moiety, where the phrase "aromatic moiety" describes a monocyclic or polycyclic moiety having a completely conjugated pi-electron system. The aromatic moiety can be an all-carbon moiety or can include one or more heteroatoms such as, for example, nitrogen, sulfur or oxygen. The aromatic moiety can be substituted or unsubstituted, whereby when substituted, the substituent can be, for example, one or more of alkyl, trihaloalkyl, alkenyl, alkynyl, cycloalkyl, aryl, heteroaryl, heteroalicyclic, halo, nitro, azo, hydroxy, alkoxy, thiohydroxy, thioalkoxy, cyano and amine.

Exemplary aromatic moieties include, for example, phenyl, biphenyl, naphthalenyl, phenanthrenyl, anthracenyl, [1,10]phenanthrolinyl, indoles, thiophenes, thiazoles and, [2,2']bipyridinyl, each being optionally substituted. Thus, representative examples of aromatic moieties that can serve as the side chain within the aromatic amino acid residues described herein include, without limitation, substituted or unsubstituted naphthalenyl, substituted or unsubstituted phenanthrenyl, substituted or unsubstituted anthracenyl, substituted or unsubstituted [1,10]phenanthrolinyl, substituted or unsubstituted [2,2']bipyridinyl, substituted or unsubstituted biphenyl and substituted or unsubstituted phenyl.

The aromatic moiety can alternatively be substituted or unsubstituted heteroaryl such as, for example, indole, thiophene, imidazole, oxazole, thiazole, pyrazole, pyridine, pyrimidine, quinoline, isoquinoline, quinazoline, quinoxaline, and purine. When substituted, the phenyl, naphthalenyl or any other aromatic moiety includes one or more substituents such as, but not limited to, alkyl, trihaloalkyl, alkenyl, alkynyl, cycloalkyl, aryl, heteroaryl, heteroalicyclic, halo, nitro, azo, hydroxy, alkoxy, thiohydroxy, thioalkoxy, cyano, and amine.

Representative examples of homodipeptides that can be used to form the nanostructures of the present embodiments include, without limitation, a naphthylalanine-naphthylalanine dipeptide, phenanthrenylalanine-phenanthrenylalanine dipeptide, anthracenylalanine-anthracenylalanine dipeptide, [1,10]phenanthrolinylalanine-[1,10]phenanthrolinylalanine dipeptide, [2,2']bipyridinylalanine-[2,2']bipyridinylalanine dipeptide, (pentahalo-phenylalanine)-(pentahalo-phenylalanine)dipeptide, phenylalanine-phenylalanine dipeptide, (amino-phenylalanine)-(amino-phenylalanine)dipeptide, (dialkylamino-phenylalanine)-(dialkylamino-phenylalanine)dipeptide, (halophenylalanine)-(halophenylalanine) dipeptide, (alkoxy-phenylalanine)-(alkoxy-phenylalanine) dipeptide, (trihalomethyl-phenylalanine)-(trihalomethyl-phenylalanine)dipeptide, (4-phenyl-phenylalanine)-(4-phenyl-phenylalanine)dipeptide and (nitro-phenylalanine)-(nitro-phenylalanine)dipeptide.

In some embodiments of the present invention one or more of the peptides is modified by end-capping.

The phrase "end-capping modified peptide", as used herein, refers to a peptide which has been modified at the N-(amine)terminus and/or at the C-(carboxyl)terminus thereof. The end-capping modification refers to the attachment of a chemical moiety to the terminus, so as to form a cap. Such a chemical moiety is referred to herein as an end-capping moiety and is typically also referred to herein and in the art, interchangeably, as a peptide protecting moiety or group.

The phrase "end-capping moiety", as used herein, refers to a moiety that when attached to the terminus of the peptide, modifies the end-capping. The end-capping modification typically results in masking the charge of the peptide terminus, and/or altering chemical features thereof, such as, hydrophobicity, hydrophilicity, reactivity, solubility and the like. Examples of moieties suitable for peptide end-capping modification can be found, for example, in Green et al., "Protective Groups in Organic Chemistry", (Wiley, second ed. 1991) and Harrison et al., "Compendium of Synthetic Organic Methods", Vols. 1-8 (John Wiley and Sons, 1971-1996).

The use of end-capping modification, allows to control the chemical properties and charge of the nanostructures. End-capping of a peptide can be used to modify its hydrophobic/hydrophilic nature.

Representative examples of N-terminus end-capping moieties suitable for the present embodiments include, but are not limited to, formyl, acetyl (also denoted herein as "Ac"), trifluoroacetyl, benzyl, benzyloxycarbonyl (also denoted herein as "Cbz"), tert-butoxycarbonyl (also denoted herein as "Boc"), trimethylsilyl (also denoted "TMS"), 2-trimethylsilyl-ethanesulfonyl (also denoted "SES"), trityl and substituted trityl groups, allyloxycarbonyl, 9-fluorenylmethyloxycarbonyl (also denoted herein as "Fmoc"), and nitro-veratryloxycarbonyl ("NVOC").

Representative examples of C-terminus end-capping moieties suitable for the present embodiments are typically moieties that lead to acylation of the carboxy group at the C-terminus and include, but are not limited to, benzyl and trityl ethers as well as alkyl ethers, tetrahydropyranyl ethers, trialkylsilyl ethers, allyl ethers, monomethoxytrityl and dimethoxytrityl. Alternatively the —COOH group of the C-terminus end-capping may be modified to an amide group.

Other end-capping modifications of peptides include replacement of the amine and/or carboxyl with a different moiety, such as hydroxyl, thiol, halide, alkyl, aryl, alkoxy, aryloxy and the like, as these terms are defined herein.

In some embodiments of the present invention, all of the peptides that are used for coating are end-capping modified.

End-capping moieties can be further classified by their aromaticity. Thus, end-capping moieties can be aromatic or non-aromatic.

Representative examples of non-aromatic end capping moieties suitable for N-terminus modification include, without limitation, formyl, acetyl trifluoroacetyl, tert-butoxycarbonyl, trimethylsilyl, and 2-trimethylsilyl-ethanesulfonyl. Representative examples of non-aromatic end capping moieties suitable for C-terminus modification include, without limitation, amides, allyloxycarbonyl, trialkylsilyl ethers and allyl ethers.

Representative examples of aromatic end capping moieties suitable for N-terminus modification include, without limitation, fluorenylmethyloxycarbonyl (Fmoc). Representative examples of aromatic end capping moieties suitable for C-terminus modification include, without limitation, benzyl, benzyloxycarbonyl (Cbz), trityl and substituted trityl groups.

When dipeptides are employed, they can be collectively represented by the following general Formula I:

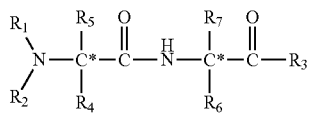

Formula I where:

C* is a chiral or non-chiral carbon; $R_1$ and $R_2$ are each independently selected from the group consisting of hydrogen, alkyl, cycloalkyl, aryl, carboxy, thiocarboxy, C-carboxylate and C-thiocarboxylate; $R_3$ is selected from the group consisting of hydroxy, alkoxy, aryloxy, thiohydroxy, thioalkoxy, thioaryloxy, halo and amine; and each of $R_4$-$R_7$ is independently selected from the group consisting of hydrogen, alkyl, cycloalkyl, aryl, heteroaryl, heteroalicyclic, hydroxy, thiohydroxy (thiol), alkoxy, aryloxy, thioalkoxy, thioaryloxy, C-carboxylate, C-thiocarboxylate, N-carbamate, N-thiocarbamate, hydrazine, guanyl, and guanidine, as these terms are defined herein, provided that at least one of $R_4$-$R_7$ comprises an aromatic moiety, as defined hereinabove.

Also contemplated are embodiments in which one or more of $R_4$-$R_7$ is other substituent, provided that at least one comprises an aromatic moiety.

Also contemplated are embodiments in which one or more of $R_1$-$R_3$ is the end-capping moieties described hereinabove.

Depending on the substituents, each of the C* carbon atoms in each of the compounds described above, can be chiral or non-chiral. Any chiral carbon atom that is present in the peptides of the present embodiments can be in D-configuration, L-configuration or racemic. Thus, the present embodiments encompass any combination of chiral and racemic carbon atoms, including all the possible stereoisomers, optical isomers, enantiomers, and anomers. The peptides of the present embodiments can be synthesized while retaining a configuration of the reactants (e.g., the amino acids). Hence, by selecting the configuration of the reactants (e.g., amino acids) and the appropriate syntheses conditions, the optical purity (e.g., the inclusion of chiral and/or racemic carbons) and the obtained stereoisomers of the resulting peptides can be determined. In cases where racemic mixtures are obtained, known techniques can be used to separate the optical or stereo-isomers. Such techniques are described, for example, in "Organic chemistry, fourth Edition by Paula Yurkanis Bruice, page 180-185 and page 214, Prentice Hall, Upper Sadde River, N.J. 07458."

Figure 1:
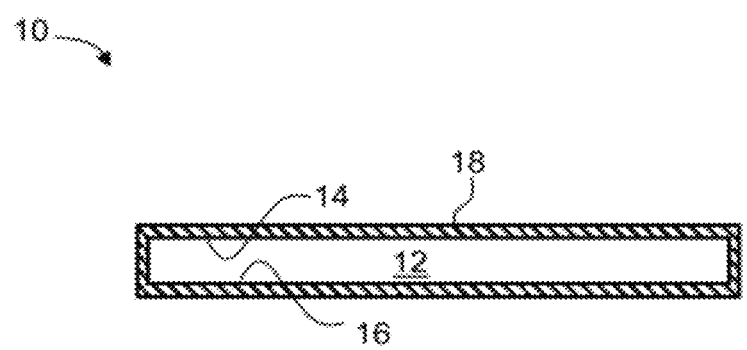

Referring now to the drawings, FIG. 1 is a schematic illustration of an electroactive device 10, according to some embodiments of the present invention. Device 10 comprises a solid structure 12 having one or more surfaces 14, 16 coated by at least one layer 18 of discrete peptide nanocrystals. The discrete peptide nanocrystals forming layer(s) 18 can have any of the properties described above. Layer(s) 18 can be deposited on one or more of the surfaces of solid structure 12.

Solid structure 12 can be an electrically conductive electrode, such as, but not limited to, a carbon electrode. Optionally and preferably at least one of the surfaces of solid structure 12 are porous such that at least a portion of the discrete peptide nanocrystals penetrate, at least partially, into the surface.

Figure 2:
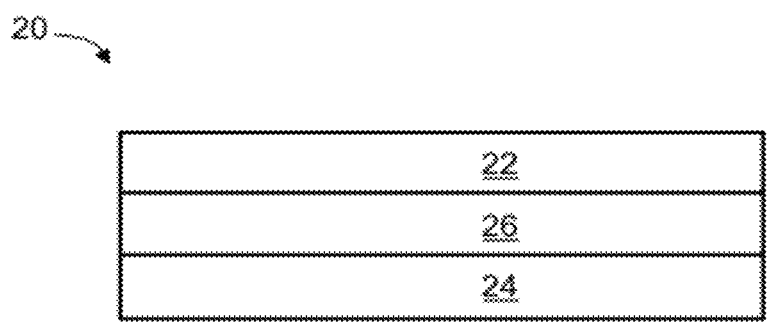

Device 10 can serve as a component in a variety of devices. FIG. 2 is a schematic illustration of an energy storage device 20 incorporating device 10. Energy storage device 20 can be, for example, a capacitor or a supercapacitor.

Device 20 can comprise a first electrode device 22, a second electrode device 24, and a separator member 26 between devices 22 and 24. Electrode device 22 and/or 24 can comprises a solid structure coated by discrete peptide nanocrystals, as further detailed hereinabove with respect to device 10. Separator member 26 can be of any type suitable for separating between the negative and positive poles of a capacitor. For example, separator member 26 can comprise an ion exchange membrane which can be made of, for example, glass microfiber, polypropylene, polyethylene or the like.

In some embodiments of the present invention device 20 is an electrochemical capacitor or electrochemical supercapacitor. In these embodiments separator member 26 is soaked in an electrolyte as known in the art. For example, the electrolyte can be an ionic liquid, such as, but not limited to, a fused molten salt with a melting point lower than or near room temperature, generally referred to as a room temperature ionic liquid, preferably a non-volatile ionic liquid. Ionic liquids have several unique physicochemical properties, such as high thermal and chemical stability, negligible vapor pressure, relatively high ionic conductivity, and wide electrochemical potential stability. The constituents of ionic liquid salts are bulky organic cations with a variety of anions. The physical properties of the ionic liquids depend on the type of the cation and anion and also on the type of the alkyl group. Ionic liquids suitable for the present embodiment include imidazolium, pyridinium and quaternary ammonium salts.

Device 20 can be configured for predominantly capacitive storage of electrical energy or predominantly Faradic storage of electrical energy. Faradic storage of electrical energy is based on transfer of electrons across the electrode interface of the device, and the charge/discharge process is accompanied by redox reactions on the surfaces of the electrodes. Capacitive storage of electrical energy is based on the principle in which the electric charge is stored electrostatically, wherein positive and negative electrostatic charges accumulate on the electrode surfaces, and the electrical energy is stored as an electrostatic force in form of a charge separation in the electric double layer between the electrolyte and the electrode.

It is recognized that a supercapacitor implements both methods of energy storage. Thus, a predominantly Faradic storage of electrical energy refers to a configuration in which the main contribution to the energy accumulation process is Faradic, and a predominantly capacitive storage of electrical energy refers to a configuration in which the main contribution to the energy accumulation process is capacitive.

While the embodiments above were described with a particular emphasis to a storage device which is a capacitor or a supercapacitor, it is to be understood that more detailed reference to capacitor or a supercapacitor is not to be interpreted as limiting the scope of the invention in any way. For example, the coating layer of the present embodiments can also be employed in an electrochemical cell, wherein at least one pole of the electrochemical cell is electroactive device 10.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", an and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example I

Figure 3:
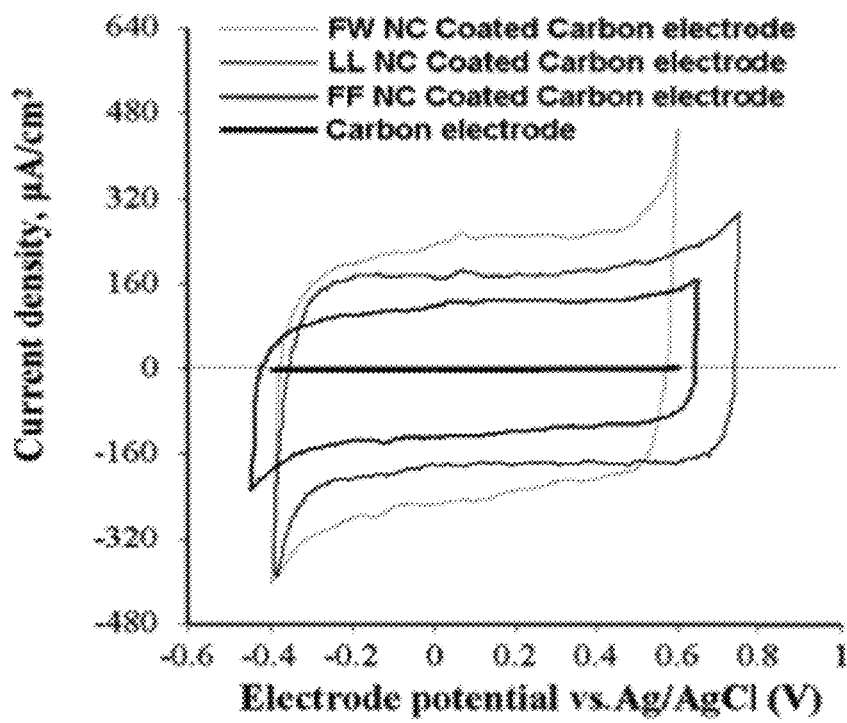

The method of the present embodiments was successfully applied to modification of the carbon electrodes. Aromatic FF and FW as well non-aromatic LL raw dipeptide materials were used. FIG. 3, below demonstrates cyclic voltammetry graphs of the carbon and peptide modified electrodes. Shown in FIG. 3 are CV measurements in KCL electrolyte at a scan rate 100 mVs$^{-1}$ for the carbon electrode (thick black line), FF NC modified carbon electrode (black line), LL NC modified carbon electrode (thin black line), FW NC modified carbon electrode (grey line). The data show that the geometric capacitance for the modified electrodes is much higher that that for the carbon electrode which has the ground capacitance $C_{DL}$~20 g/cm$^2$.

The current density response found for FF-modified electrode is by about 60 times higher than that for the background carbon electrode. FF-NC-modified carbon electrodes led to significant growth of the electrical double-layer capacitance density reaching $C_{DL}$ ~1200 µF/cm$^2$. LL NC-modified electrode is by ~80 times higher than that for background carbon electrode and it possesses electrical double-layer capacitance density reaching $C_{DL}$ ~1600 µF/cm$^2$. FW NC-modified carbon electrode showed the electrical double-layer capacitance density $C_{DL}$ ~2500 µF/cm$^2$ for the geometric electrode area which by 125 times higher than that for the carbon electrode.

Figure 4:
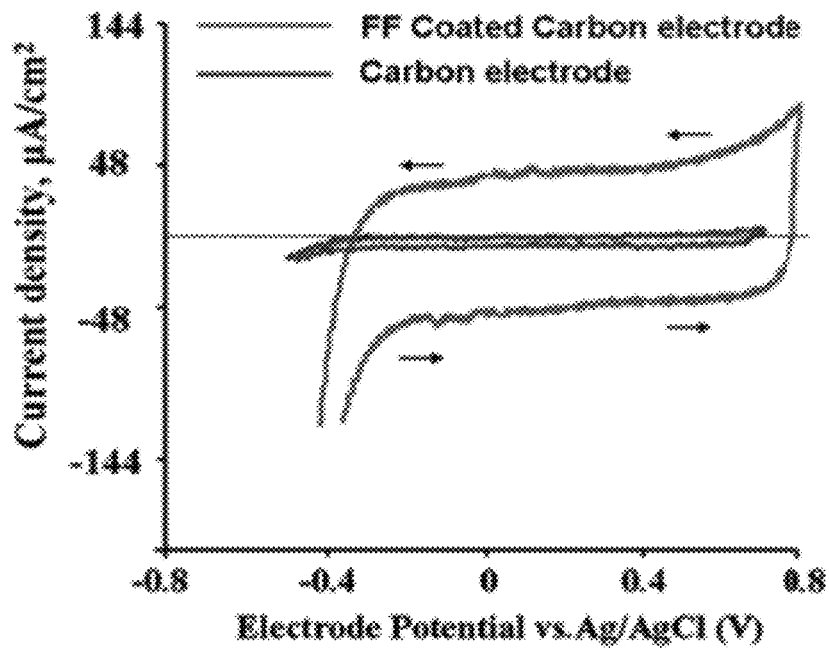

FIG. 4 demonstrates CV data for vapor deposited peptide nanotubes in the same KCL electrolyte at a scan rate 100 mVs$^{-1}$ for the carbon electrode and FF peptide nanotubes vapor deposited on the carbon electrode as described in PCT Patent Application No. PCT/IL2008/001118 supra. The electrical double-layer capacitance of the peptide nanotubes-modified carbon electrode is $C_{DL}$~480 µF/cm$^2$.

Example II

In this example, the self-assembly process and fine structure of two different aromatic dipeptides, FF (NH$_2$-Phe-Phe-COOH) and NH$_3$-Phe-Trp-COOH (FW) is studied by measurements of optical absorption and luminescence effects.

Formation of nanoscale regions and pronounced quantum confinement (QC) have been recently observed in peptide nanotubes (PNT) and peptide nanospheres. A QD-quantum confined structure, also known as a quantum dot (QD) structure, within micrometer size peptide spheres made from an analog of the FF dipeptide has also been observed[1]. A 2D-quantum confined structure, also known as a quantum well structure, has been observed within PNT made by vapor deposition process.[2]

The results presented in this example demonstrate that FF peptide nanotubes (PNT) is composed from QD-like structure. The results below also demonstrate that the quantum dots are the elementary building blocks of the PNT, and they can exist as a single entity also in a solution. These QD-like structures are referred to below as peptide quantum dots (PQD). The pronounced QC and exciton effects allows to directly observe the self-assembly and disassembly processes of the elementary building blocks of the PNT.

The first stage of forming either the QD or the PNT from the FF peptide monomer was achieved by dissolving the FF powder in a strong solvent of hexafluoro-2-propanol (HFIP), which allowed the FF monomers to stay at their monomeric state and not form any structure. For forming the PQD structure, the concentrated HFIP solution was dissolved in methanol at a desired concentration (2-10 mg/ml). For forming the PNT structure, the concentrated HFIP solution was dissolved in ddH$_2$O at a desired concentration (2-5 mg/ml). At low concentration (<1 mg/ml), the FF monomers tend to stay at their monomeric state and not form PQD or tube structure.

FIG. 5a is a SEM image of the FF PNT, and FIG. 5b is an AFM image of the FF PQD. The double arrow between (a) and (b) symbolizes the reversibility of the process, from PQD to PNT and vice versa. FIG. 5c shows a cross section along the blue line at (b), which shows the height of the PQD, and FIG. 5d shows a height histogram of the FF PQD.

The PQD have a homogenous diameter, as can be seen in the cross-section (FIG. 5c). The size distribution of the FF PQD was measured (FIG. 5d). The size distribution displays an average diameter of 2.12±0.15 nm for the PQD. To the contrary, the PNT (FIG. 5a) have a wide diversity in their diameter, which can range from 50 nm to several micrometers. While changing the methanol environment of the PQD to aqueous solution, the PQD undergo a further self-assembly process to the PNT structure. The present inventors found that this process is reversible, wherein the PNT can be dissolved in methanol again to receive the PQD structure.

For ascribing the formed nanoparticle and nanotube structures to be a QC structure composed from nanosize particles, which behaves as QD, spectroscopic measurements were used. The optical absorption properties are defined by the electron/hole energy spectrum, and the optical absorption coefficient is proportional to the density of electronic states (DOS) of the material. Different QC structures have completely different DOS behaviour, in which QD structure possesses spike-like behaviour.[3]

FIG. 6 shows optical absorption spectrum of the FF PNT (black line) and the FF PQD (red curve). FIG. 7 shows PLE spectrum of the FF PQD at several concentrations, along the PLE spectrum of a dissolved FF PNT in methanol. The emission wavelength is 290 nm.

The optical absorption of both the PQD and PNT possess identical spike-like behaviour (FIG. 6), which is an evidence for the existing of identical nanosize regions of QD in both of the structures. The most distinguishing feature of QC structures is a strong Coulomb interaction between electrons and holes due to high confinement of electron and holes in QD structure, which leads to the formation of an exciton. Thus, we can follow the formation of the exciton, and consequently to observe the QC structure, by measuring the exciton luminescence. FIG. 7 shows the photoluminescence excitation (PLE) spectrum of the PQD, at several concentrations. We can clearly observe the formation of the exciton by the narrow excitation peak (full width at half maximum-FWHM of 6 nm) at 270 nm, which being formed at high concentrations. The high concentration is distinguished by the formation of the PQD, whereas the low concentration is distinguished by the presence of the free monomers. The PLE curve of the low concentrated sample is broad, and does not show the sharp exciton peak. The forming of the narrow peak is a direct evidence of the crystalline structure formed in the PQD.[4] As in common QC systems, the exciton peak is located at the red edge of the absorption spectrum.[5] As in [1], an effect of a phononless exciton line and its phonon replicas has been observed.

For further validation that the PQD are the elementary building blocks of the FF PNT, X-ray diffraction (XRD) patterns were used. FIG. 8 shows the XRD of the FF PQD (red) and PNT (black). It can be clearly seen that both of the structures possess the same crystal structure, which correlates to the $P6_1$ space group.

From the optical absorption and PLE spectrum the dimensions of the confined structure have been calculated using a theoretical model of organic QD disclosed in[1] In this model the radius of the QD is defined as:

$$R = \pi r_B^0 \sqrt{\frac{\frac{m_0}{M}}{\frac{\mu}{m_0 \varepsilon_\infty^2} - \frac{E_{ex}^{QD}}{Ry}}} \quad (1)$$

where $r_B^0 = \hbar^2/m_0 e^2 = 0.53$ Å is the Bohr radius of the hydrogen atom, $m_0$ is the free electron mass, $Ry = m_0 e^4/2\hbar^2 = 13.56$ eV is the Rydberg constant, $M = m_e + m_h$ is the translation mass of the exciton ($m_e$ and $m_h$ are the effective mass of electron and hole), $\mu = m_e m_h/(m_e + m_h)$ is the reduced exciton mass, $\varepsilon_\infty$ is the high-frequency dielectric constant of the QD, and $E_{ex}^{QD}$ is the exciton binding energy. Due to the lack of the electronic properties of FF PQD, we have used the refractive index of the similar benzene crystal with $n = 1.5$[6] for calculating the $\varepsilon_\infty$. This defines $\varepsilon_\infty$ as $\varepsilon_\infty = n^2 = 2.25$. The optical absorption and PLE bands start from $\lambda_{ion} = 242$ nm ($\hbar^2 \omega_{ion} = 5.12$ eV), which is the breaking of the binding exciton state. The value of $\hbar^2 \omega_{ion}$ corresponds to the energy gap of the QD, which correspond to the value of the transport gap of a similar crystal, such as benzenethiol, ~5.1 eV.[7], [8] The difference between $\hbar^2 \omega_{ion}$ and the phononless line $\hbar^2 \omega_g^0 = 4.59$ eV is equal to 0.53 eV. This energy represents the exciton binding energy, $E_{ex}^{QD}$, of the QD. The effective mass of electrons and holes is almost equal and close to 0.5 $m_0$.[9] Consequently, for $\mu = 1/2$ $m_e = 0.25$ $m_0$ and for $M = m_0$, we can obtain from equation (1) the value of the PQD radius as $R \sim 1.65$ nm.

The size of the PQD, which was measured both by microscopy (FIGS. 5b and 5c) and by theoretical calculation, in addition to the composition of the PQD, which was measured by time of flight secondary ion mass spectrometry (ToF-SIMS) and mass-spectrometry (MS), suggest that each PQD is composed from two FF monomers.

FIG. 9a shows optical absorption (blue curve) and PLE (black and red curves) spectra of FW PQD. The emission wavelength is 365 nm. FIG. 9b is an AFM image of the FW PQD layer. FIG. 9c shows a cross section along the green line of FIG. 9b.

The dipeptide of FW is similar to the FF peptide, due to its high aromaticity level. FW has a similar spectroscopic signature as the FF peptide (FIG. 9a). Its optical absorption spectrum also consists of several peaks (blue curve), though the peaks here are broader in comparison to the absorption peaks of the FF peptide (FIG. 6), which might be resulted due to disorders of the nanocrystalline structure.[10] The PLE characteristics also exhibit similar behavior as the FF peptide. Whereas the low concentrated sample of 0.125 mg/ml displays broad PLE spectrum (FIG. 9a, black curve), the high concentrated sample of 2 mg/ml displays narrow PLE spectrum (red curve), with a FWHM of 12 nm, which indicates on the formation of an exciton. As similar to the absorption peaks, the FWHM of the FW peptide is also broader then the FWHM of the FF peptide (6 nm). The spectroscopic analysis of FW pointing that FW can also undergo the self-assembly process to PQD structure. By using equation (1) the expected dimensions of the PQD can be calculated. In the FW PQD structure, the exciton peak is located at 306 nm (4.05 eV). The optical absorption bands start from $\lambda_{ion}$ of 293 nm ($\hbar^2 \omega_{ion} = 4.23$ eV). From these two values the exciton binding energy was found to be $E_{ex}^{QD} = 185$ meV. From equation (1) the FW PQD radius is $R \sim 9$ Å.

To validate our calculations we measured the formed PQD structure by AFM (FIG. 9b). FIG. 9c shows a cross section along the green line of FIG. 9b, which points on a height of 1.1-1.3 nm. This height is lower than the height of the FF-PQD ~2.1 nm), and it is close to the calculated value of 9 Å.

Unlike the FF peptide, the FW peptide does not form PNT at aqueous solution, which remains transparent. The spectroscopic characteristics (FIG. 9a), which point on the formation of PQD, can be achieved both in ddH2O and in organic solvent (such as methanol).

The size of the PQD can be tuned, for example, by judicious selection of the peptides, such as the described FW peptide. A particular advantage of the PQD possesses, in comparison with the conventional QD, is the unsophisticated, fast and cheap formation process. Whereas some of the conventional synthesis processes for QD require the use of sophisticated and expensive processes.

Experimental Section

PNT were prepared by dissolving the lyophilized form of the FF/FW building blocks in 1,1,1,3,3,3-hexafluoro-2-propanol (HFIP) at a concentration of 100 mg/ml. The FF stock solution was diluted to a final concentration of 2 mg/ml in ddH2O for the nanotubes self-assembly process to occur. To avoid any pre-aggregation and assembly, fresh stock solutions were prepared for each experiment.

FF-PQD were prepared in two ways. The first one was to dissolve the prepared PNT in the methanol solution. The second way was to dilute the stock solution (FF in HFIP) in methanol at different concentrations, 1-8 mg/ml. FW-PQD were prepared by dissolving the FW stock solution either in ddH2O or at methanol.

XRD patterns were recorded using a symmetric Bragg geometry 'Scintag' powder diffractometer equipped with Cu Kα radiation source, and a liquid-nitrogen-cooled Ge solid-state detector.

ToF-SIMS analysis was carried out using a Physical Electronics TRIFT II ToF-SIMS instrument using a 15-kV Ga primary ion gun.

MS data was collected on Waters SYNAPT MS system, at electrospray positive mode.

Scanning electron microscopy—The samples were coated with palladium-gold and scanned using a JSM JEOL 6300 scanning electron microscope operating at 5-10 kV.

The AFM analysis was generated by depositing an aliquot of FF PQD on a freshly cleaved mica surface. The samples were probed by a Digital Instrument (DI) MultiMode™ NanoScope IV AFM, using a Mikromasch NSC15/Si3N4 cantilever (resonant frequency f=325 kHz, spring constant k=40 N/m) in a tapping mode.

The optical absorption measurements were performed using Ultrospec® 2000 (Pharmacia Biotech, UK). The PL and PLE measurements were performed using Fluoro-Max®-3 spectrofluorometer (Horiba Jobin Yvon, USA).

Example III

FIGS. 10A and 10B show an HRSEM image (FIG. 10A) and XRD plot (FIG. 10B) of a peptide oligomers coating formed on a carbon electrode by chemical deposition. As shown, the peptide oligomers form an amorphous layer on the surface of the electrode. Subsequently the oligomers form nanocrystals as demonstrated in Examples I and II above.

REFERENCES

[1] N. Amdursky, M. Molotskii, E. Gazit, G. Rosenman, *App. Phys. Lett.* 2009, 94, 261907.
[2] N. Amdursky, M. Molotskii, D. Aronov, L. Adler-Abramovich, E. Gazit, G. Rosenman, *Nano Lett.* 2009, 9, 3111-3115.
[3] O. Svelto, *Principles of Lasers*, Pleneum Press, New York, 1998.
[4] R. J. Nelson, in *Excitons*, North-Holland, Amsterdam, 1982; E. F. Schubert, E. O. Gobel, Y. Horikoshi, K. Ploog, H. J. Queisser, *Phys. Rev. B* 1984, 30, 813-820.
[5] J. F. Muth, J. H. Lee, I. K. Shmagin, R. M. Kolbas, H. C. Casey, B. P. Keller, U. K. Mishra, S. P. DenBaars, *App. Phys. Lett.* 1997, 71, 2572-2574.
[6] G. W. Kaye, T. H. Laby, *Tables of Physical and Chemical Constants*, Longmans, Green & Co, London, 1959.
[7] I. J. Lalov, I. Zhelyazkov, *Phys. Rev. B* 2007, 75.
[8] C. D. Zangmeister, S. W. Robey, R. D. van Zee, Y. Yao, J. M. Tour, *J. Phys. Chem. B* 2004, 108, 16187-16193.
[9] R. S. Sanchez-Carrera, V. Coropceanu, E. G. Kim, J. L. Bredas, *Chem. Mater.* 2008, 20, 5832-5838.
[10] E. Talgorn, E. Moysidou, R. D. Abellon, T. J. Savenije, A. Goossens, A. J. Houtepen, L. D. A. Siebbeles, *Journal of Physical Chemistry C*, 114, 3441-3447.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An electroactive device, comprising a solid structure coated by at least one coating layer of peptide material forming discrete peptide nanocrystals, wherein at least 70% of said peptide material in said at least one coating layer is devoid of any non-covalent bonds.

2. The device of claim 1, wherein at least some of said discrete peptide nanocrystals occupy pores in a surface of said solid structure.

3. The device of claim 1, wherein at least some of said discrete peptide nanocrystals are peptide quantum dots.

4. The device of claim 3, wherein said discrete peptide nanocrystals are devoid of or contain less than 10% peptide quantum wells.

5. The electroactive device according to claim 1, wherein said solid structure is an electrically conductive electrode.

6. The electroactive device according to claim 1, wherein said solid structure is a carbon electrode.

7. The electroactive device according to claim 1, wherein said solid structure is a semiconductor electrode.

8. An energy storage device, comprising the electroactive device of claim 1.

9. The device of claim 8, being an electrochemical capacitor.

10. The device of claim 9, wherein said electrochemical supercapacitor is a supercapacitors or a ultracapacitors.

11. The device of claim 9, wherein said electrochemical capacitor is configured for capacitive storage of electrical energy.

12. The device of claim 9, wherein said electrochemical capacitor is configured for Faradic storage of electrical energy.

13. An electrochemical cell, comprising the electroactive device of claim 1.

14. A method of storing electrical energy, comprising charging the energy storage device of claim 8.

15. A method of fabricating a device, comprising coating a solid structure by at least one coating layer of peptide material forming discrete peptide nanocrystals, under conditions that at least partially prevent assembly of said nanostructures into supramolecular structures, wherein at least 70% of said peptide material in said at least one coating layer is devoid of any non-covalent bonds.

16. The method of claim 15, wherein at least some of said nanostructures are discrete peptide nanocrystals.

17. The method of claim 16, wherein at least some of said discrete peptide nanocrystals are peptide quantum dots.

18. The method of claim 15, wherein at least some of said nanostructures are peptide oligomers, and the method further comprises generating conditions for said oligomers to form discrete peptide nanocrystals, while at least partially preventing assembly of said discrete peptide nanocrystals into supramolecular structures.

19. The method of claim 15, wherein at least some of said peptides are linear peptide monomers and wherein said conditions are selected so as to at least partially prevent transformation of said linear peptide monomers into cyclic peptide monomers.

20. The method according to claim 15, wherein said coating comprises immersing said solid structure in a liquid solution containing said nanostructures.

21. The method according to claim 15, wherein said coating is effected by vapor deposition.

22. The method according to claim 15, further comprising forming said nanostructures by a top-down process.

23. The method according to claim 22, wherein said top-down process comprises a chemical process.

24. The method according to claim 23, wherein said chemical process comprises treatment in inorganic solution.

25. The method according to claim 24, wherein said inorganic solution comprises sulfuric acids of sufficiently low pH.

26. The method according to claim 23, wherein said chemical process comprises treatment in organic solution.

27. The method according to claim 26, wherein said organic solution comprises hexafluoro-2-propanol.

28. The method according to claim 22, wherein said top-down process comprises a mechanical process.

29. The method according to claim 28, wherein said mechanical process comprises treatment by ultrasound waves.

30. The method according to claim 15, wherein said solid structure is an electrode.

31. The method according to claim 15, wherein said solid structure is a semiconductor structure.

32. An energy storage device, comprising an electrode device manufactured by a method according to claim 30.

33. The device of claim 1, wherein for at least a portion of said peptide nanocrystals, a highest dimension of said peptide nanocrystals is less that 10 nm.

\* \* \* \* \*